Aug. 4, 1970  F. R. ELLEDGE, JR  3,523,290
FLASHING WARNING SIGNAL
Filed Dec. 19, 1967  3 Sheets-Sheet 2
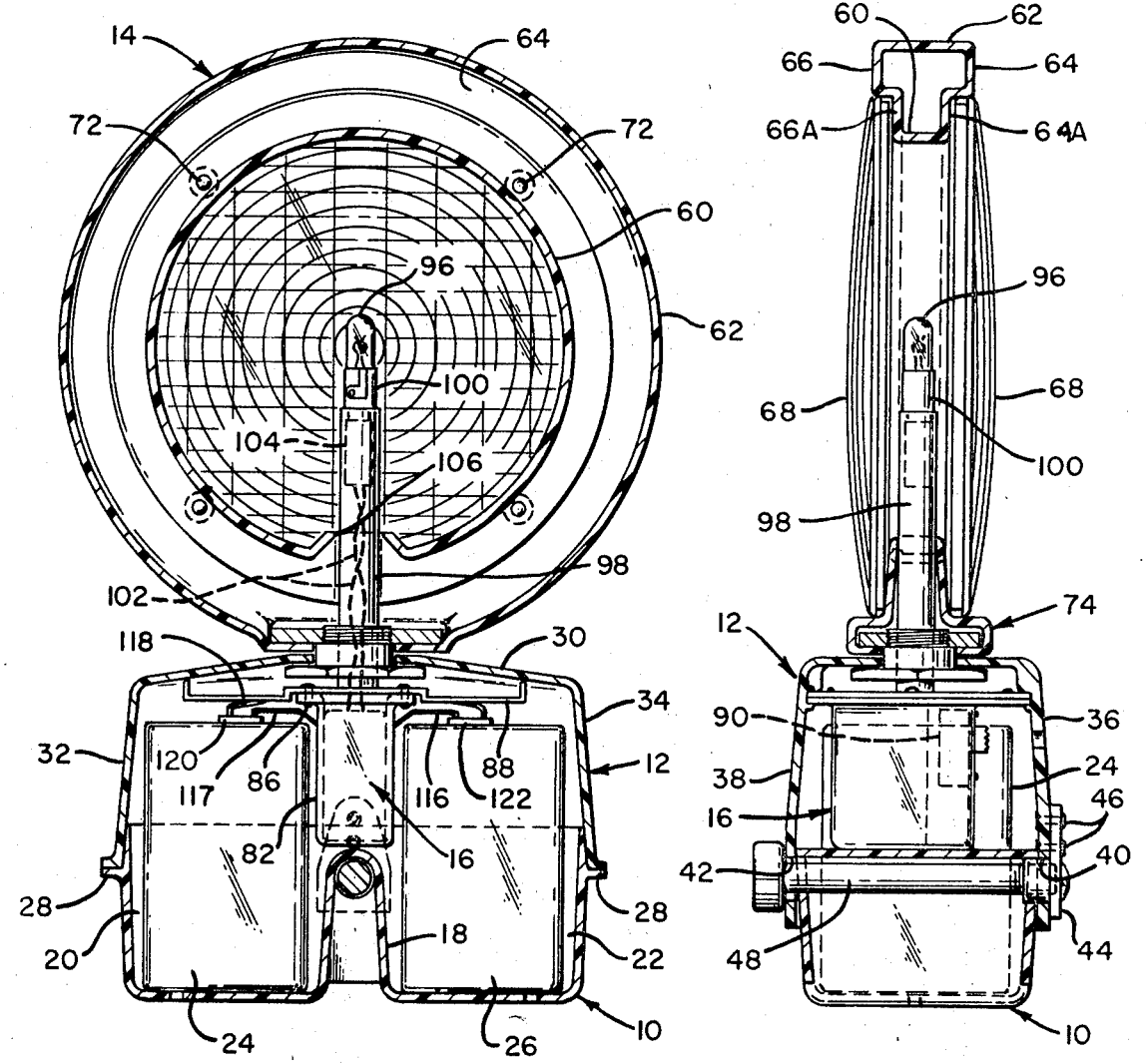
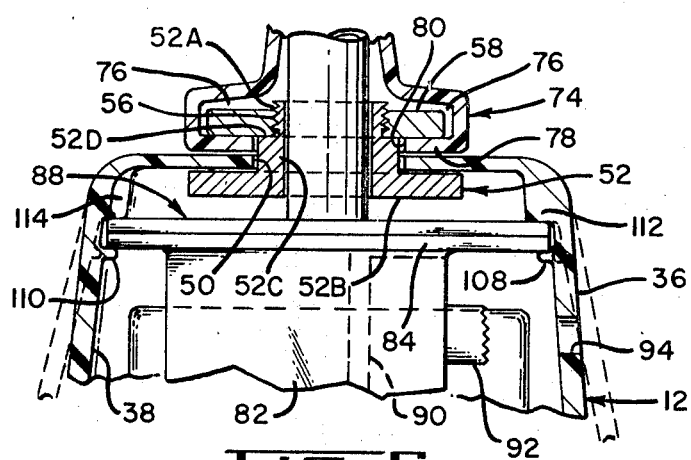
INVENTOR.
FRED R. ELLEDGE, JR.
Gregg & Stidham
BY  ATTORNEYS

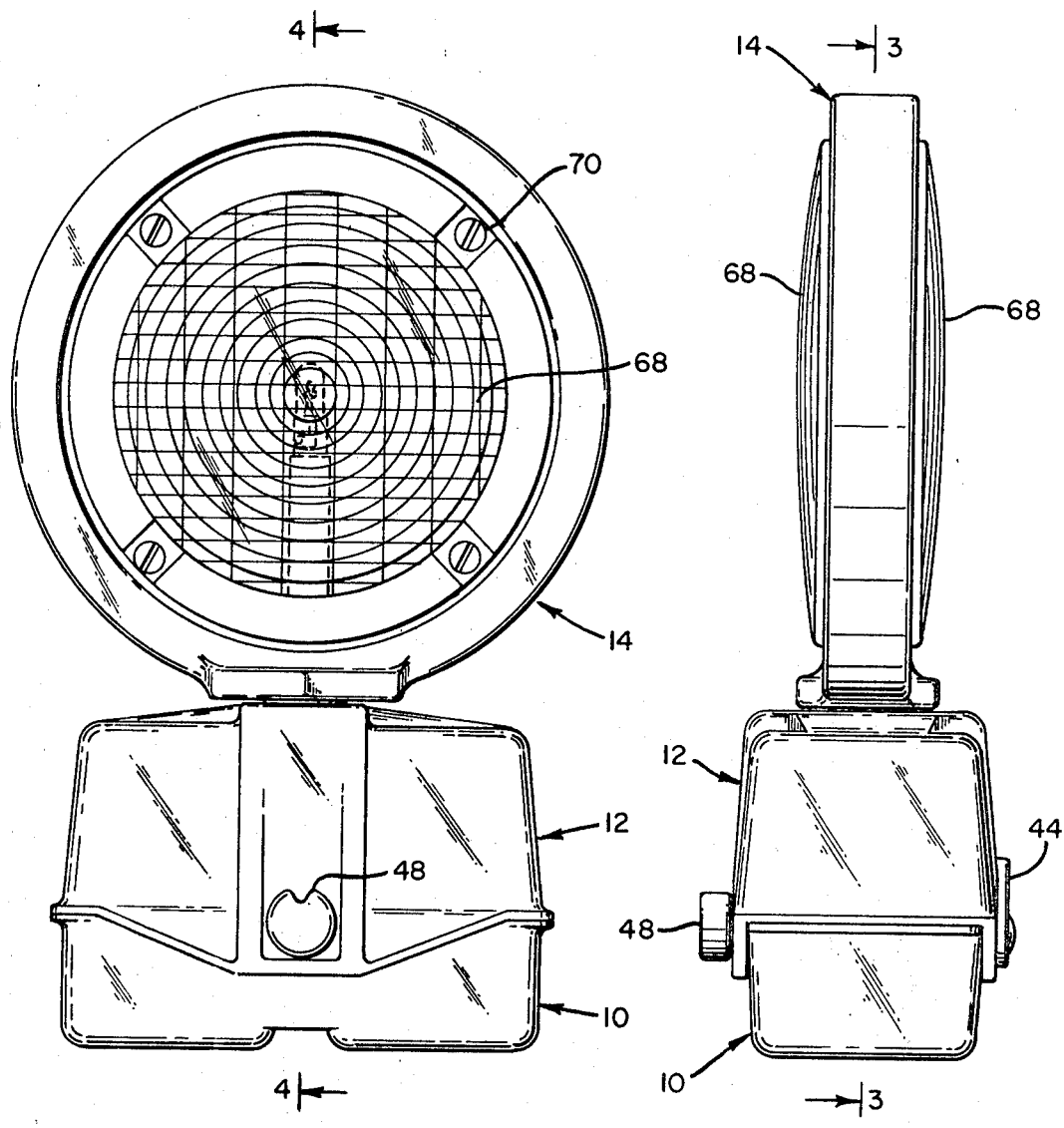

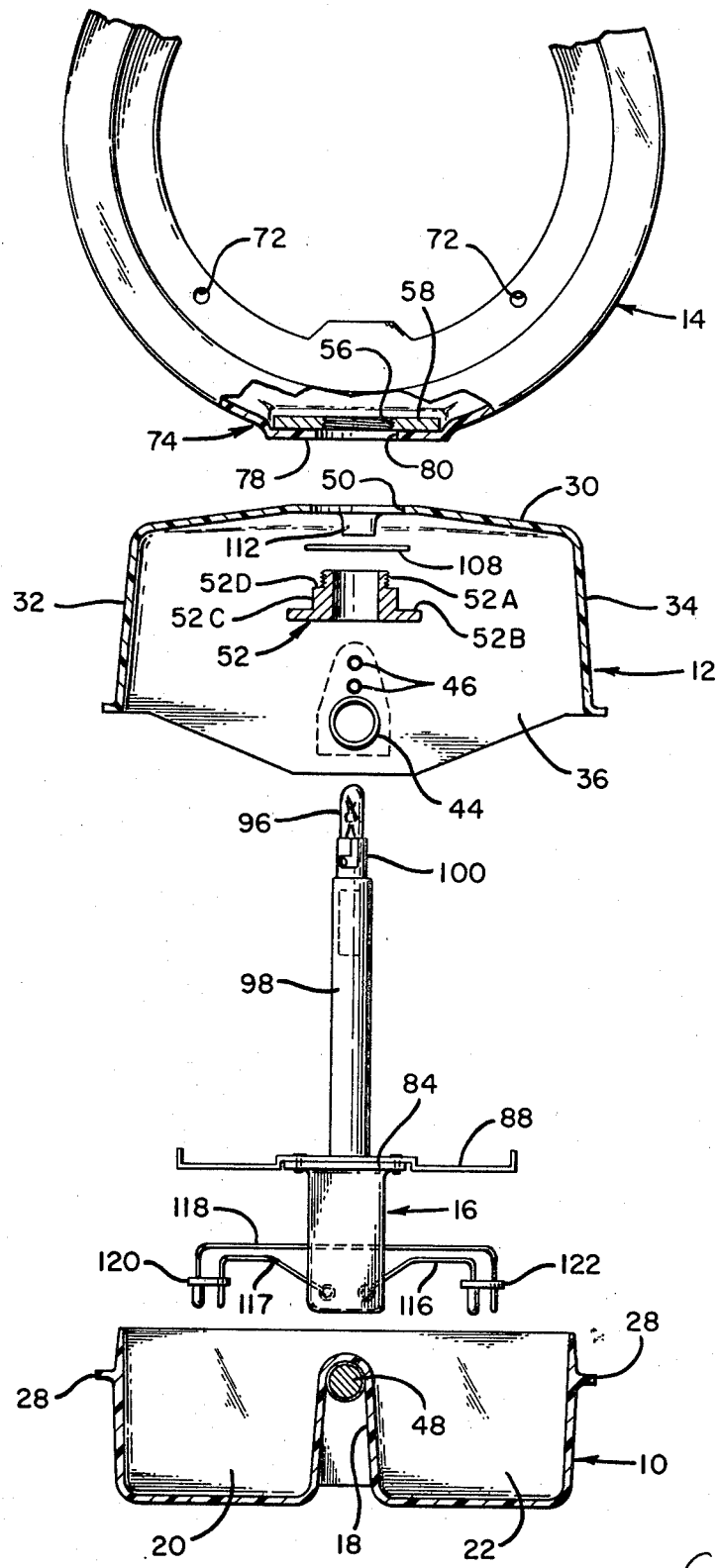

United States Patent Office 3,523,290
Patented Aug. 4, 1970

3,523,290
FLASHING WARNING SIGNAL
Fred Russell Elledge, Jr., 2332 Eva St.,
Napa, Calif. 94558
Filed Dec. 19, 1967, Ser. No. 691,799
Int. Cl. F21v 33/00; G08b 5/00
U.S. Cl. 340—331                                    5 Claims

ABSTRACT OF THE DISCLOSURE

A signal device of the type which includes a battery accommodating case, a cover releasably secured to the case, and a novel head assembly rotatably secured to the cover. The head assembly comprises a molded plastic hollow body which is generally ring-shaped and formed with radially spaced inner and outer walls interconnected by axially spaced side walls. A pair of lenses are secured to the opposite side walls of the body. A fastening plate is included inside the body at a pair of aligned openings in the inner and outer walls thereof, and a cooperating headed tubular fastening member extends through an aperture in the cover, through the opening in the outer body wall, and engages the fastening plate within the body. A signal lamp member comprising a body releasably secured inside the cover, and having an elongated stem portion extending through the fastening member carries a lamp at the inner end of the stem for viewing through the lenses. A pair of opposed, inwardly directed lips on the inside of the cover releasably support the signal lamp member therewithin, the cover being sufficiently flexible to permit spreading of the opposed lips when the cover is removed from the case for attaching and removing the lamp member.

DESCRIPTION

This invention relates to a warning signal device and more particularly to a flasher construction for warning the public of a potentially dangerous condition.

Warning signal lights are well known and often are attached to portable barricades used to indicate a dangerous or unusual condition and to divert persons therefrom. The flashing warning light is required during night time use.

The warning lights often are used on construction jobs including road construction, repair and maintenance projects. They are required to operate reliably for extended periods of time without maintenance or repair. Also, for obvious reasons the initial cost thereof should be a minimum.

An object of this invention is the provision of a rugged and reliable flashing warning light which requires a minimum of mantenance and repair.

An object of this invention is the provision of a warning device which is easily assembled and disassembled to facilitate manufacture and repair.

An object of this invention is the provision of a flashing warning device which includes a novel molded head which is inexpensively produced yet extremely durable and strong.

An object of this invention is the provision of an improved signal lamp assembly mounting means whereby the lamb assembly is readily snapped into position inside the cover of a flasher construction.

The above and other objects and advantages of the invention are achieved by a signal device comprising a battery accommodating case, a cover removably secured to the case, a head assembly rotatably attached to the cover, and a signal lamp assembly which includes a flashing lamp. The novel head assembly comprises a molded plastic body which is generally ring-shaped. The body is formed with radially spaced inner and outer walls interconnected by opposed axially spaced side walls. A pair of aligned openings are formed in the inner and outer walls of the body, and a fastening plate is provided inside the body at the aligned openings therein. The head assembly is secured to the body by use of a headed tubular fastener which extends through an aperture in the cover and the opening formed in the outer wall body, and which releasably engages the fastening plate provided inside the body. The signal lamp assembly, having a base portion and elongated stem portion, is releasably secured to the cover. Novel releasable securing means comprising inwardly directed lips on opposite side walls of the cover which cooperate with an edge of the base portion of the signal lamp releasably secure the lamp assembly to the cover. The lamp assembly is released from the cover by slightly spreading apart the lip bearing cover walls when the cover is removed from the case.

The invention will be better understood from the following description when considered in light of the drawings. In the drawings, wherein like reference characters refer to the same parts in the several views:

FIG. 1 is a side elevational view of a flasher signal device embodying this invention;

FIG. 2 is an end view of the device shown in FIG. 1;

FIG. 3 is a sectional view taken along line 3—3 of FIG. 2;

FIG. 4 is a sectional view taken substantially along line 4—4 of FIG. 1;

FIG. 5 is an enlarged fragmentary sectional view showing the fastening means for rotatably attaching the head assembly to the cover, and also showing the releasable fastening means for releasably securing the signal lamp assembly to the cover; and FIG. 6 is an exploded view of the signal device without the lenses and with portions shown in section.

Reference is now made to the drawings wherein the novel flasher warning device is shown comprising a battery accommodating case 10, a cover 12 removably secured to the case, a head assembly 14 rotatably secured to the cover, and a signal lamp assembly 16 removably secured to the cover, and removable therefrom when the cover is removed from the case.

The case 10 may be of similar construction to that shown in my U.S. Pat. No. 3,221,300 dated Nov. 30, 1965 and entitled "Warning Signal Device." The illustrated case is of an open box shape having a deep U-shaped upwardly extending groove, or channel, 18 formed in its bottom which separates the case into two substantially equal size compartments 20 and 22 to accommodate batteries 24 and 26, respectively, as seen in FIGS. 3, 4 and 5. Any suitable batteries may be used including a pair of Eveready No. NEDA 920 types. The case may be made of metal, plastic or like material which is substantially impervious to shock and environmental conditions. The ends of the case are provided with outwardly directed flanges 28 upon which the cover 12 seats in the closed condition.

The cover 12, which is made of plastic, metal or other suitable material, comprises top member 30 and four downwardly extending side walls 32, 34, 36 and 38, with the lower edges of walls 32 and 34 abutting the case flanges 28 in the closed condition as seen in FIGS. 1, 2 and 3. Axially aligned openings 40 and 42 (see FIG. 4) are formed in the side walls 36 and 38, respectively, and a threaded nut 44 is attached to the wall 36 at the opening 40 as by rivets 46. The shank of a bolt 48 extends through the opening 42 in the cover, along the channel 18 in the case, and threadedly engages the nut 44 to firmly lock the cover 12 to the case 10. The bolt 48 may be used for securing the flashing warning device to a barricade, or the like, not shown.

The top wall 30 of the cover 12 is formed with a central aperture 50 through which a threaded tubular fastening member 52 extends for rotatably attaching the head assembly 14 to the cover 12. External threads 52A on the member 52 engages internal threads 56 of a captive fastening plate 58 inside the head assembly 14 for attachment of the head to the cover. This rotatable connection is described in greater detail following a description of the novel head assembly 14.

The head assembly 14 comprises a novel hollow body of generally annular shape formed with a radially spaced inner and outer walls 60 and 62, respectively, interconnected by axially spaced side walls 64 and 66. The side walls preferably are stepped inwardly along the inner radius as indicated at 64A and 66A to provide recessed seating surfaces for a pair of lenses 68. The lenses are made of any suitable material and color. Plastic lenses of acrylic or butyrate and which are commercially available are satisfactory. They are secured to the plastic head by screws 70 (FIG. 1) extending through holes in the lenses and threadedly engaging the head. Indentations are formed during the molding of the head to serve as guides for the screws 70 which penetrate the wall when threaded thereto. The head is molded of a suitable tough, yet resilient plastic (e.g., polyethylene) such that small diameter indentations 72 molded therein are expanded by the screws to tightly grip the same. No threading of the indentations 72 is required.

The head 14 is formed with a support base 74 which may extend outwardly beyond the side walls 64 and 66, as seen in FIGS. 2, 4 and 5 to provide recesses 76 into which the side edges of the fastening plate 58 extend. The base has a generally flat bottom wall 78 adapted to engage the flat top portion of the cover 12 in the assembled condition. The fastening plate and interior of the base are of similar shape and size whereby the plate 58 is maintained therewithin adjacent the aperture 80 in the bottom wall 78. The head is formed as by a blow molding process, and the fastennig plate 58 is located therewithin during the process. Following the molding process the head is ready for assembly with a minimum of additional preparation.

The tubular fastener 52 is formed with a head 52B at one end and a shank portion 52C. In the assembled condition, the shank portion 52C of the fastener 52 extends through the aperture 50 in the cover, through the aperture 80 in the bottom wall 78 of the base, and as mentioned above, the threaded end 52A threadedly engages the plate 58. The threaded end 52A of the fastener is of a smaller diameter than the fastener shank 52C such that a shoulder 52D is formed on the shank which abuts the plate 58 when the fastener is threaded into the plate 58. The fastener 52 is tightened against the plate to lock the same thereto. With the bolt and plate locked together, the spacing between the head of the bolt 52 and plate 58 is sufficient to accommodate the bottom wall 78 of the base and top wall 30 of the cover, and to place the same in snug frictional engagement. The head 14 together with the fastening plate 58 and bolt 52 are rotatable through 360 degrees for orienting the head in any direction about its axis of rotation.

The lamp assembly 16 includes a main body portion 82 formed with an outwardly extending flange 84 at the upper end thereof (see FIG. 3). A mounting plate 88 is secured to the top of the flange by posts 86 extending upwardly from the flange. An electronic circuit comprising components such as transistors, resistors, capacitors (not shown) and an on-off switch 90 are encapsulated in the main body portion 82. The switch actuating arm 92 is located adjacent a small opening 94 in the side 36 of the cover through which a length of stiff wire, or the like, may be extended for actuating the same. The circuit is of an oscillatory type for flashing on-off operation of a lamp 96 included in the assembly.

A tubular stem 98 extends from the mounting flange 88, at the outer end of which stem a lamp socket 100 is mounted for holding the lamp 96. Wires 102 extend from the encapsulated electronic circuitry to the socket through the stem. If desired, the stem may be light permeable, and a photoconductor element 104 may be included therein which is sensitive to ambient light for automatically switching the circuit to an "off" condition during daylight and "on" when it is dark. With this arrangement, during normal operation the manually actuated switch 90 is maintained in the "on" position and the circuit is automatically switched between the "on" and "off" conditions. Electronic circuitry of this type is well known and requires no detailed description.

The stem 98 is dimensioned to pass through the tubular fastening bolt 52, through an aperture 106 in the wall 60 (see FIG. 3) and into the body space between the lenses 68, with the lamp 96 at a line along the lens axis. The lamp assembly is supported in place by means of the flange 84 and mounting plate 88. As best seen in FIG. 5, opposite side edges of the flange 84 are supported upon inwardly directed lips or protrusions 108 and 110 formed on the cover side walls 36 and 38, respectively. Bosses 112 and 114 are formed on the cover side walls a spaced distance above the lips 108 and 110 for engagement with the plate 88 whereby the lamp assembly is firmly mounted inside the cover. By accurately locating the lips and bosses on the cover, the lamp assembly 16, when installed in the cover is accurately located to accurately position the lamp 96 at the lens axis. When the cover 12 is removed from the case 10, the side walls 36 and 38 may be spread outwardly, as shown in broken line position in FIG. 5, to release the lamp assembly from the cover. In the assembled condition the cover walls 36 and 38 are prevented from spreading apart by the fastening bolt 48 extending therebetween, as seen in FIG. 4, whereby the lamp assembly is securely maintained in proper position.

Battery leads 116, 117 and 118 and suitable battery connectors 120 and 122 are provided for connection of the batteries 24 and 26 to the electronic circuitry 82. A series circuit connection for the batteries is illustrated. Obviously, the batteries could be connected in parallel, if desired.

The invention having been described in detail in accordance with the requirements of the patent statutes, various changes and modifications may suggest themselves to those skilled in the art, and it is intended that such changes and modifications shall fall within the spirit and scope of the invention as defined in the appended claims.

I claim:

1. In a signal device of the type which includes a battery accommodating case, a cover releasably secured to the case, and a head assembly secured to the cover, the improvement wherein said head assembly comprises,
    a generally ring-shaped hollow body formed of molded plastic with radially spaced inner and outer walls interconnected by opposite spaced side walls and defining a pair of aligned openings through the inner and outer walls,
    a fastening plate with an opening therein disposed inside the molded plastic body at the aligned openings in the inner and outer body walls,
    a tubular fastening member extending from within the cover through an aperture therein and through the opening in the outer body wall into engagement with the fastening plate at the opening therethrough for fastening together the cover and body, and
    a pair of lenses secured to the opposite side walls of the body.

2. The signal device as defined in claim 1 including,
    a signal lamp assembly having a body portion, a mounting plate, and an elongated stem portion extending through the tubular fastening member, opposite edges of the mounting plate being releasably secured to the cover.

3. The signal device as defined in claim 1 wherein said tubular fastening member is formed with a head at one end, and a shank with a large diameter portion adjacent the head and a smaller diameter externally threaded portion at the free end thereof, the opening in said fastening plate being threaded for engagement with the threaded end portion of the tubular fastening member, said large diameter shank portion extending through the aperture in the cover and opening in the outer body wall, and abutting the fastening plate inside the body in tight engagement therewith.

4. A signal device comprising,
 a cover including a top plate formed with an opening therein,
 a generally ring-shaped molded plastic head comprising a pair of radially spaced inner and outer walls interconnected by opposite spaced side walls,
 aligned apertures in the inner and outer walls of the head,
 a fastening plate with a threaded aperture inside the head with said aperture in alignment with the apertures in the head,
 a tubular fastener member formed with a head at one end and a shank with an enlarged diameter portion adjacent the head and a smaller diameter threaded end portion for engagement with the threaded aperture in the fastening plate, said large diameter shank portion extending through the aperture in the cover and through the opening in the outer wall of the body and abutting the fastening plate, the head of the fastener member being positioned inside the cover.

5. A signaling device including a battery case having a releasable cover comprising,
 a body having the shape of a hollow annulus with radially spaced walls joined by axially spaced walls, said body being formed by molding, and
 a captive fastening plate disposed in said hollow annulus and sealed therein during molding of the body, said plate being adapted to engage a fastening member extending from said cover to join said body and said cover.

References Cited

UNITED STATES PATENTS

| | | | |
|---|---|---|---|
| 3,221,300 | 11/1965 | Elledge | 340—331 X |
| 3,226,678 | 12/1965 | Dekko et al. | 340—119 |
| 3,264,461 | 8/1966 | Osburn | 240—2 |

DONALD J. YUSKO, Primary Examiner

M. SLOBASKY, Assistant Examiner

U.S. Cl. X.R.

240—2; 340—119